United States Patent
Trowbridge et al.

(10) Patent No.: US 7,440,948 B2
(45) Date of Patent: Oct. 21, 2008

(54) SYSTEM AND METHOD OF ASSOCIATING OBJECTS IN SEARCH RESULTS

(75) Inventors: Jon Eric Trowbridge, Chicago, IL (US); Nathaniel Dourif Friedman, Boston, MA (US)

(73) Assignee: Novell, Inc., Provo, UT (US)

( * ) Notice: Subject to any disclaimer, the term of this patent is extended or adjusted under 35 U.S.C. 154(b) by 341 days.

(21) Appl. No.: 11/229,628

(22) Filed: Sep. 20, 2005

(65) Prior Publication Data
US 2007/0067292 A1  Mar. 22, 2007

(51) Int. Cl.
*G06F 17/30* (2006.01)
(52) U.S. Cl. .......................................... 707/7
(58) Field of Classification Search ............ 707/1, 707/2, 3, 7, 10, 104.1; 715/513; 709/224
See application file for complete search history.

(56) References Cited

U.S. PATENT DOCUMENTS

| | | | |
|---|---|---|---|
| 4,897,782 A | 1/1990 | Bennett et al. | 364/200 |
| 5,287,504 A | 2/1994 | Carpenter et al. | 395/600 |
| 5,577,241 A | 11/1996 | Spencer | 395/605 |
| 6,081,750 A | 6/2000 | Hoffberg et al. | 700/17 |
| 6,272,455 B1 | 8/2001 | Hoshen et al. | 704/1 |
| 6,272,507 B1 * | 8/2001 | Pirolli et al. | 715/513 |
| 6,349,137 B1 | 2/2002 | Hunt et al. | 379/265.06 |
| 6,400,996 B1 | 6/2002 | Hoffberg et al. | 700/83 |
| 6,480,881 B1 | 11/2002 | Kubota et al. | 709/202 |
| 6,647,383 B1 | 11/2003 | August et al. | 707/3 |
| 7,213,040 B1 | 5/2007 | Stokes et al. | 707/203 |
| 2002/0087649 A1 | 7/2002 | Horvitz | 709/207 |
| 2002/0147805 A1 | 10/2002 | Leshem et al. | 709/223 |
| 2002/0174134 A1 | 11/2002 | Goykham | 707/104.1 |
| 2003/0018634 A1 | 1/2003 | Shringeri et al. | 707/4 |
| 2003/0099399 A1 | 5/2003 | Zelinski | 382/186 |
| 2004/0030753 A1 | 2/2004 | Horvitz | 709/206 |

(Continued)

OTHER PUBLICATIONS

Otto Bruggeman, [Patch] kdirwatch.cpp, Sep. 21, 2002, kde-core-devel list http://lists.kde.org/?1=kde-core-devel&m=10326583012353&w=2, 2 pages.

(Continued)

*Primary Examiner*—Etienne P LeRoux
(74) *Attorney, Agent, or Firm*—Pillsbury Winthrop Shaw Pittman LLP (57) ABSTRACT

The invention is directed to a system and method of observing actions performed on a computer and inferring relationships between objects based on information corresponding to the observed actions. The invention provides an initial content-based search of the desktop system to generate a list that includes a relevance ranking of objects that correspond to a search term. The content-based search result objects may be analyzed for user-action-based information and/or computer-action-based information so that an action-based association comparison may be performed between objects that are discovered during the content-based search. A re-ordering of the list of relevant content-based search result object may be performed and objects may be removed from the list of content-based search results objects. A timeline may be accessed to add action-based search result objects to the list of content-based search result objects. The combined list of action-based search result objects and content-based search result objects may be re-ordered based on results on results from the updated action-based association comparison.

26 Claims, 5 Drawing Sheets

U.S. PATENT DOCUMENTS

| | | | |
|---|---|---|---|
| 2004/0049494 A1 | 3/2004 | Kottisa | 707/3 |
| 2004/0049512 A1 | 3/2004 | Kawakita | 707/100 |
| 2005/0114374 A1 | 5/2005 | Juszkiewicz et al. | 707/101 |
| 2006/0010120 A1 | 1/2006 | Deguchi et al. | 707/4 |

OTHER PUBLICATIONS

Josef Weidendorfer, Re:[PATCH] kdirwatch.cpp, Sep. 23, 2002, kde-core-devel list http://lists.kde.org/?l=kde-core-devel&m=103279747704133&w=2, 1 page.

Sven Radej, "class KDirWatch", 2003, <http://api.kde.org/3.1-api/classref/kio/KDirWatch.html>.

Microsoft, Outlook 2003 Screenshots, Copyright 2003, 9 pages.

Corbet, "Watching Filesystem Events with Inotify", Sep. 29, 2004 availbale online: <http://wn.net.Articles/104343/>, 5 pages.

\* cited by examiner

SYSTEM AND METHOD OF ASSOCIATING OBJECTS IN SEARCH RESULTS

BACKGROUND

1. Field of the Invention

This invention relates to a system and method of observing actions performed on a computer and processing information that corresponds to the observed actions. In particular, the invention is directed to inferring relationships between objects based on information corresponding to the observed actions. More particularly, the invention is directed to improving the relevancy ranking and ordering of desktop search results based on the inferred relationships between objects.

2. Background Information

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications do not analyze the relationships between objects when conducting desktop searches to improve the relevancy ranking and ordering of desktop search result objects or search result events based on the inferred relationships between objects. Known applications also do not enable the system to add and/or delete search result objects or search result events in response to searches submitted by a user.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. The objects may include information, such as personal information, user data, and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a correlation determining system is provided to analyze information that is associated with the user initiated actions and to analyze information that corresponds to the several types of objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value.

According to another embodiment of the invention, information corresponding to user initiated actions and computer initiated actions may be analyzed to improve a relevancy ranking of search result objects for a desktop system that is performed using content-based searching. An initial relevance ranking of the content-based search results may be conducted and may be adjusted using an action-based information associated with the search result objects. Search result objects from the initial content-based search may be removed from the list of search result objects if a determination is made, using an action-based association comparison, that selected search result objects are not associated with the intended search, even if the search result objects include the desired search term.

A timeline may be accessed that includes a plurality of timeline entry objects, wherein the timeline may be searched for timeline entry objects that share action-based associations with the content-based search result objects. Timeline entry objects may be added to the list of content-based search result objects if a determination is made, using the action-based association comparison, that selected timeline entry objects are associated with the intended search, even if the timeline entry objects do not include the desired search term. The combined list of search result objects may be adjusted based on results from an updated action-based association comparison. A relevant ranking of desktop search result objects may be displayed to the user and may be configured to enable the user to review and/or modify the relevance ranking list of desktop search result objects.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
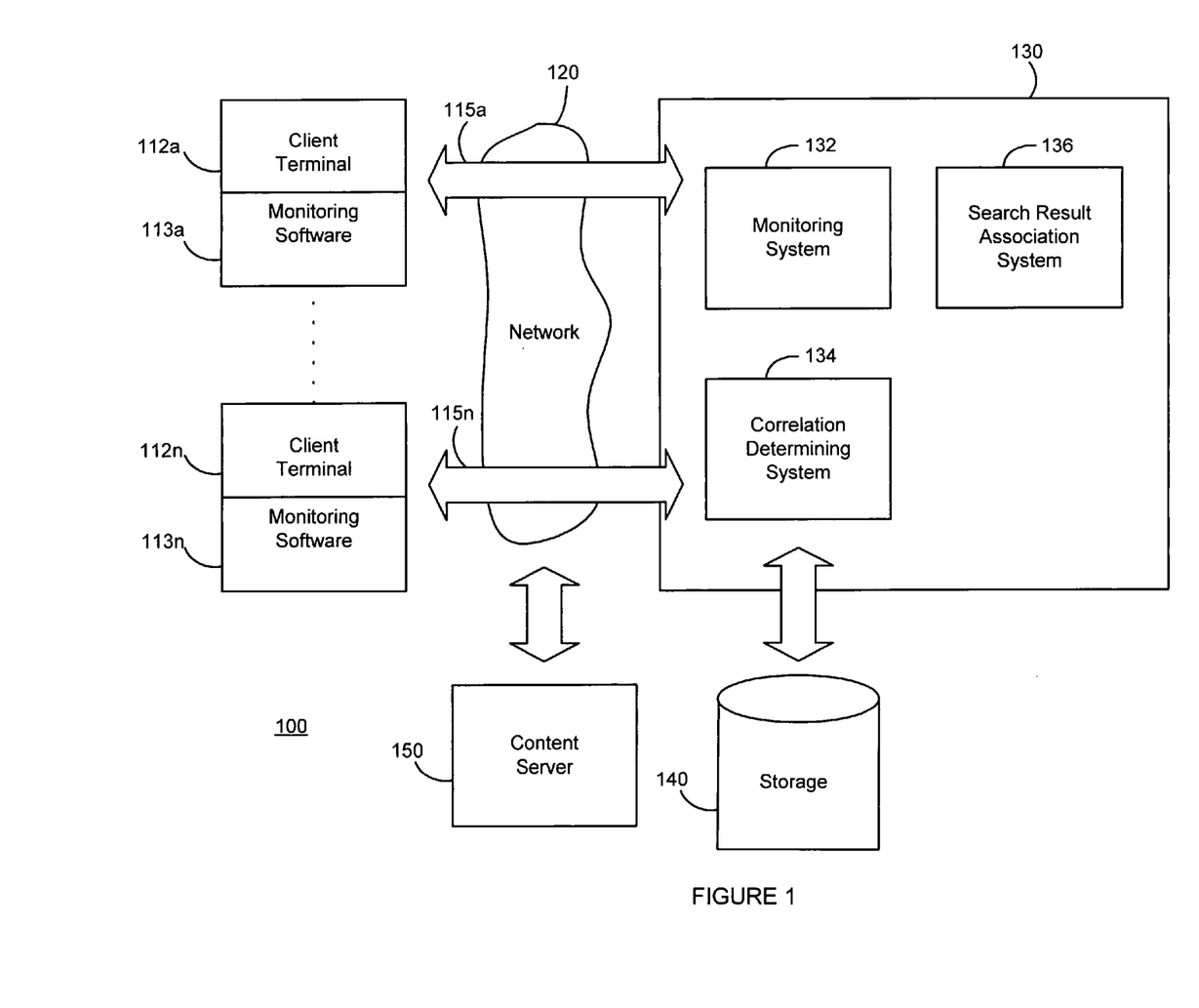
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to another embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored to determine if any objects are accessed through the client terminal. Objects may include applications, documents, files, email messages, chat sessions, web sites, address book entries, calendar entries or other objects. The objects may include information, such as personal information, user data, and/or other information. According to one embodiment of the invention, monitoring software 113 may include client-side monitoring software. According to another embodiment of the invention, monitoring software 113 may include server-side monitoring software, such as monitoring system 132 that resides on server 130. Communications between the client terminals 112 and server 130 may be communicated through a proxy server or other servers. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and/or other user initiated action information.

Regarding computer initiated actions, computers may directly or indirectly access several types of objects during the course of the computer session. According to one embodiment of the invention, computers may perform actions including presenting an alert, activating a screen saver, initiating an auto save, automatically downloading information from a web site (such as an update file), and performing other computer initiated actions. According to one embodiment of the invention, computer initiated actions may be tracked using triggering events including, for example, generating an alert, launching of a screen saver, initiating an auto save, and/or other triggering events. The type of information that corresponds to computer initiated actions may include, for example, when objects are automatically opened and/or closed, when the screen saver is activated, when an auto save is activated, and/or other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system, or other type of system, for tracking information including, for example, tracking when windows appear and/or disappear from the graphical user interface, tracking which window on the GUI is focused, and/or other tracking information. In another embodiment of the invention, the information may be gathered by directly observing the windows-based system and mapping windows back to the associated applications, among other techniques. In yet another embodiment of the invention, the information may be gathered by directly observing the windows-based system to monitor when the client terminal is actively being used or sitting idle, among other status information. One of ordinary skill in the art will readily appreciate that other techniques may be used to gather information associated with the observed user initiated actions and/or computer initiated actions.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening http://www.novell.com in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening www.novell.com in window 12345," among other actions. One of ordinary skill in the art will readily appreciate that other techniques may be used to gather information associated with the observed user initiated actions and/or computer initiated actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, generating alerts, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 2:
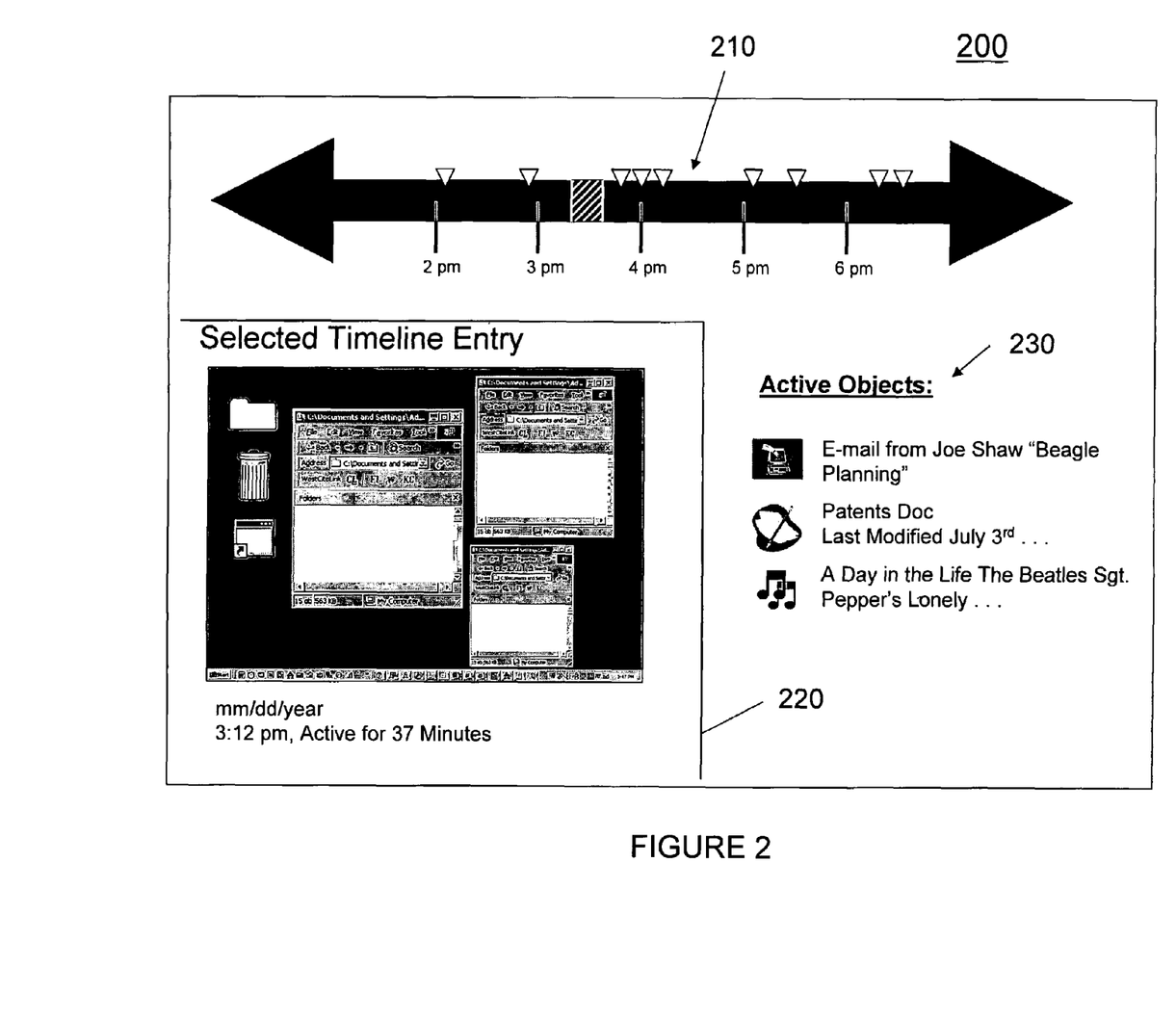
FIG. 2 illustrates an exemplary embodiment of a timeline according to one embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as screenshots, dates that objects are accessed, times that objects are accessed, lengths of time that objects are active, and/or other information. Display 200 may also include a portion 230 that lists active objects. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. One of ordinary skill in the art will appreciate that various configurations may be provided for organizing and/or displaying the information corresponding to the user initiated actions and the computer initiated actions.

According to another embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

Figure 3:
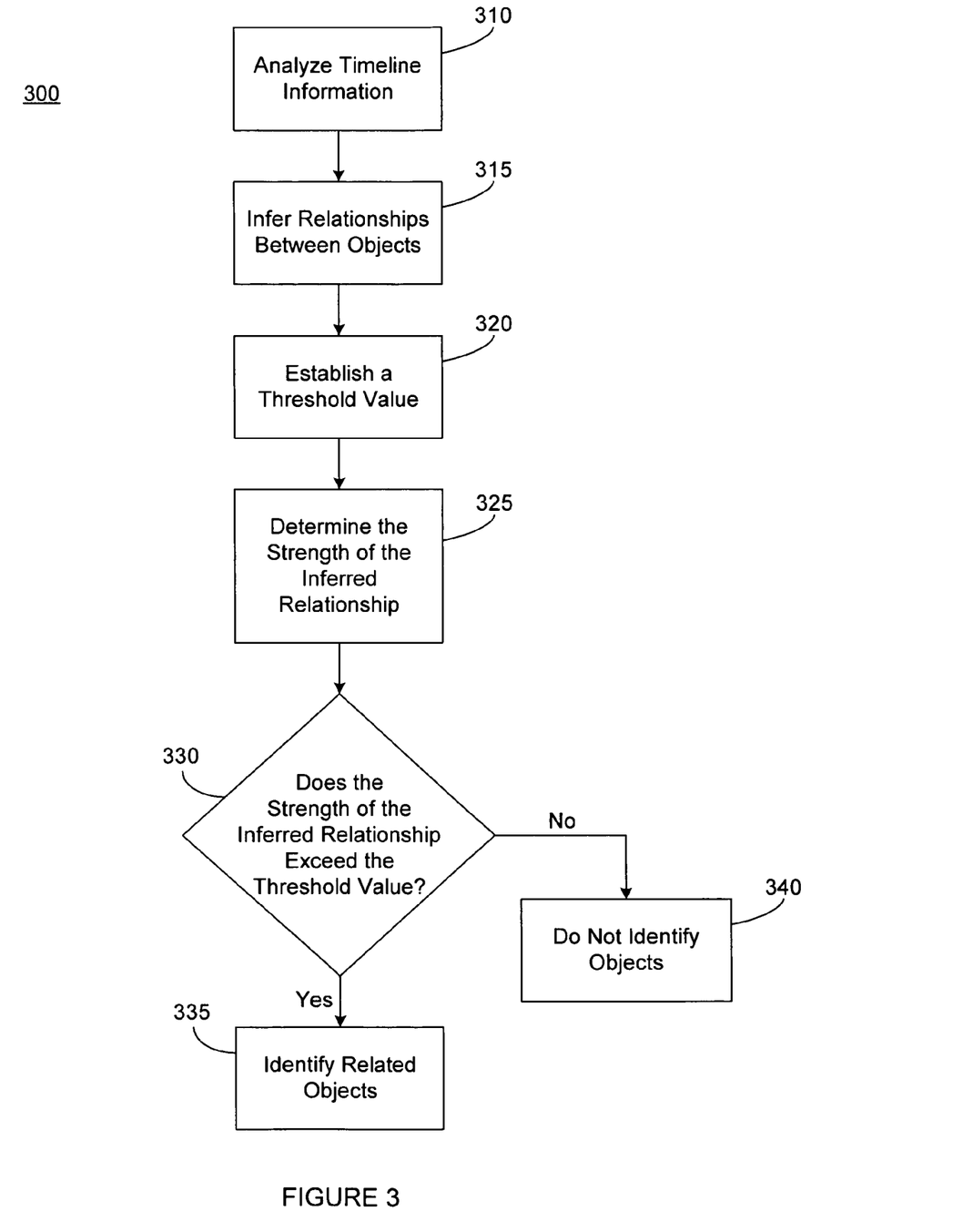
FIG. 3 illustrates a flow chart schematic for analyzing relationships between objects according to an embodiment of the invention.

According to another embodiment of the invention, correlation determining system 134 may analyze information corresponding to user initiated actions and computer initiated actions to discover relationships between objects. FIG. 3 illustrates a flow diagram 300 of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters that are derived from information associated with the user initiated actions that relate to these objects including, for example, a temporal order in which the objects are accessed, focus toggling between the first object and the third object, opening the first object contemporaneously with the third object, and other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors that are associated with the user initiated actions and the computer initiated actions. According to one embodiment of the invention, the relevance may be provided with values determined from factors including, for example, a frequency of the user initiated actions, simultaneous/sequential occurrence of user initiated action, a duration of user initiated actions, overall chronological proximity of user initiated actions, and/or other factors. In operation 330, the strength of the relationships derived from the factors may be compared to the threshold value. In operation 335, a relationship between objects may be identified if the strength of the relationship is determined to exceed a predefined threshold value. Alternatively, in step 340, a relationship between objects may not be identified if the strength of the relationship is determined to be below a predefined threshold value. One of ordinary skill in the art will readily appreciate that other techniques may be used to determine the strength of relationships between objects.

In known systems, relationships between objects may be discovered by searching desktop object content. However, for the example discussed above, known systems that only rely on content-based searching to discover relationships between objects would not identify that the first object (i.e., an email message) is related to the third object (i.e., a word processing document), if the first object and the third object include different content (e.g., terminology). Additionally, known systems that only rely on content-based searching may be deficient because a complete set of search result objects may not be produced if different terms are used to describe a same concept (e.g., synonymy). For example, when different terms are used to describe a same concept, a content-based search of objects that is performed using less than all of the different terms would produce under-inclusive search results. In other words, performing a search using only a content-based search may produce search results that include fewer than all of the available objects due to synonymy.

Alternatively, known systems that only rely on content-based searching may be deficient because irrelevant search result objects may be produced if a same term includes multiple meanings (e.g., polysemy). For example, when a single term describes different concepts, a content-based search of objects that is performed using the single term would produce over-inclusive search results, with content from several of the search results differing from the intended meaning of the search. In other words, performing a search using only a content-based search may produce search results that include additional objects that are irrelevant due to polysemy.

According to one embodiment of the invention, action-based searching may be combined with content-based searching to improve desktop search results by improving relevancy ranking and ordering of desktop search results, by reducing the effects of synonymy and/or polysemy in desktop search results, and by providing other benefits. Throughout this specification, action-based searching includes user action-based searching, computer action-based searching, or other action-based searching.

According to another embodiment, the invention provides relevant search results that may be presented in an ascending or descending order of importance, among other presentations. If an object that a user seeks is presented far down a list that is organized based on order of importance, then the search application may be considered useless. In order to improve the relevance of search results, action-based searching may be combined with content-based searching to discover non-apparent associations between objects, thereby reducing synonymy. Additionally, action-based searching may be combined with content-based searching to dismiss apparent associations between objects, thereby reducing polysemy. Action-based relationships may be inferred between objects based on user action history, chronological proximity of user initiated actions, chronological proximity of window focus toggling, or other time-based information. Other types of information may be analyzed to infer relationships between objects.

Figure 4:
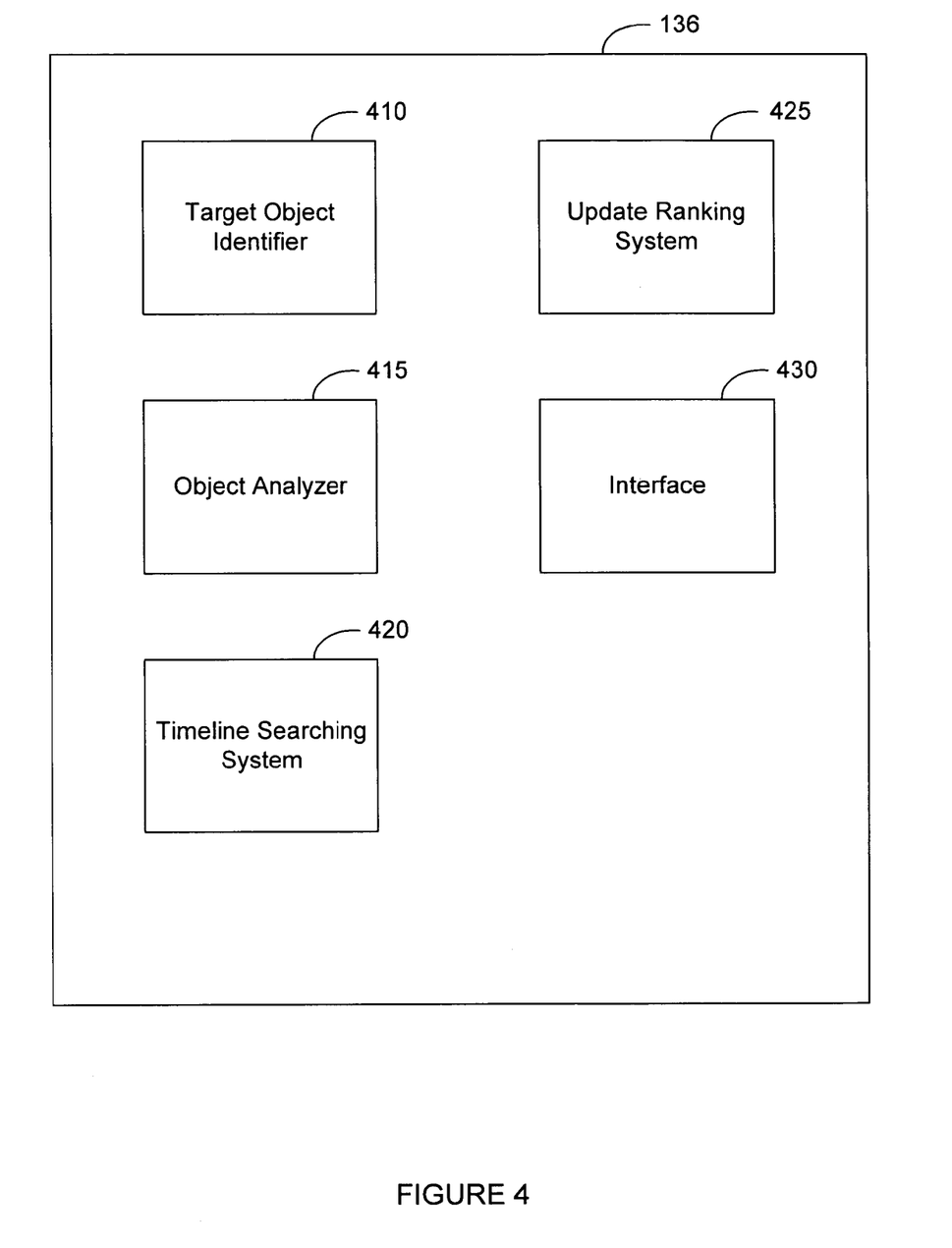
FIG. 4 illustrates an exemplary embodiment of a relevancy ranking determining device according to an embodiment of the invention.

According to one embodiment of the invention, information corresponding to user initiated actions and computer initiated actions may be analyzed by search result association system 136. As illustrated in FIG. 4, search result association system 136 may include target object identifier 410 that receives objects which are discovered during a content-based search of a desktop system and establishes an initial relevancy ranking of the discovered objects. An object analyzer 415 may be provided that analyzes information associated with the content-based search result objects and performs action-based association comparisons between objects that are discovered during the content-based search. Results from the action-based association comparisons may be used to boost the relevancy of objects that initially received a low-ranking, but are discovered to share a close action-based association to high-ranking objects. Likewise, results from the action-based association comparisons may be used to reduce the relevancy of objects that initially received a high-ranking, but are discovered to not share a close action-based association to other high-ranking objects. Furthermore, results from the action-based association comparison may be used to remove objects from the content-based search results that are determined not to be associated with the content-based search results, even if the objects include the content search term. For example, information corresponding to user-initiated actions may be used to infer relationships between two or more objects, wherein the user-initiated actions include a temporal proximity in which users access two or more objects, a temporal proximity in which users create two or more objects, a temporal proximity in which users edit two or more objects, operations that users conduct in close time proximity, or other information corresponding to user initiated action information.

According to one embodiment of the invention, search result association system 136 may include a timeline searching system 420 that accesses timeline 210 and searches timeline entry objects for action-based associations between the timeline entry objects and the objects that were discovered during the content-based search. As discussed above, timeline 210 may include timeline information having timeline entry objects that correspond to user-initiated actions and computer-initiated actions; parameters that are associated with the user-initiated actions and computer-initiated actions; or other timeline information.

The search result association system 136 further may include an update ranking system 425 that performs action-based association comparisons between objects corresponding to the content-based search and objects derived from timeline 210. Results from the action-based association comparisons may be used to boost the relevancy ranking of selected objects that are determined to share a close action-based association to high-ranking objects. Likewise, results from the action-based association comparisons may be used to reduce the relevancy ranking of selected objects that are determined not to share a close action-based association to other high-ranking objects. According to one embodiment, the update ranking system may add timeline entry objects to the list of content-based search result objects to generate a combined list that include content-based search result objects and timeline entry objects, wherein the timeline entry objects may be added if they are determined to be an action-based association with the content-based search results, even if the timeline entry objects do not include the content search term.

According to one embodiment of the invention, the search result association system 136 further may include an interface 430 that displays the relevance ranking and enable the relevance ranking to be adjusted. The interface may include a video monitor or other device that is capable of displaying information. While the search result association system 136 is illustrated to include separate components, one of ordinary skill in the art will readily appreciate that one or more components may be configured to perform these functions and that the functions may be performed using software or hardware components.

Figure 5:
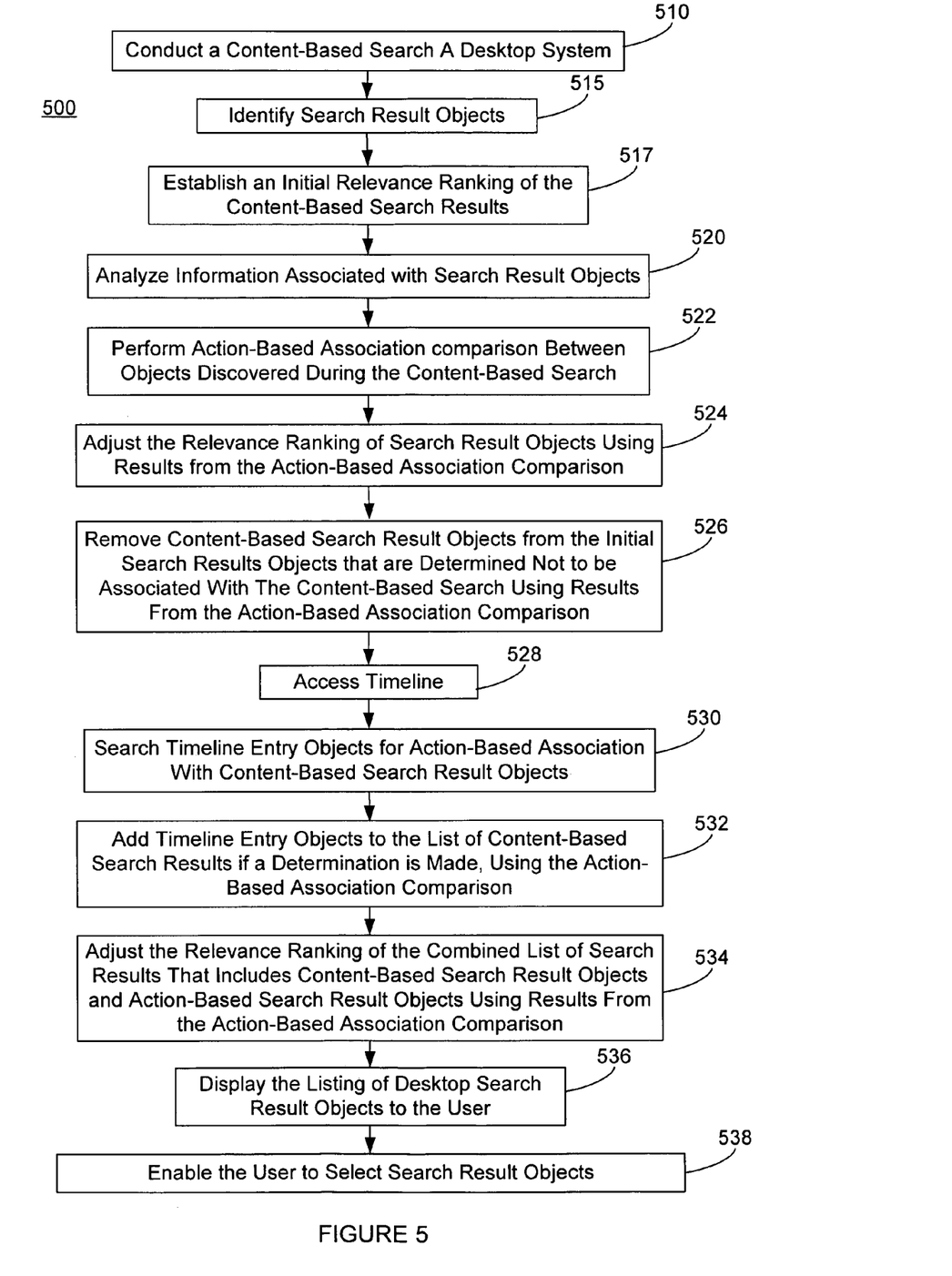
FIG. 5 illustrates a flow chart schematic for determining a relevancy ranking according to an embodiment of the invention.

FIG. 5 illustrates a flow diagram 500 for a generalized method of improving object relevance, the relevance ranking and order of desktop search results. In operation 510, a content-based search of the desktop system may be performed. In operation 515, search result objects are identified for the content-based search. In operation 517, an initial relevance ranking of the content-based search results may be established. In operation 520, the content-based search result objects may be analyzed for user-action-based information and/or computer-action-based information, among other information. In operation 522, an action-based association comparison is performed between objects that are discovered during the content-based search. In operation 524, the relevance ranking of the content-based search result objects may be adjusted based on results from the action-based association comparison. For example, results from the action-based association comparisons may be used to boost the relevancy ranking of selected content-based search result objects that are determined to share close action-based associations to high-ranking objects. Likewise, results from the action-based association comparisons may be used to reduce the relevancy ranking of selected content-based search result objects that are determined not to share close action-based associations to other high-ranking objects. In operation 526, objects from the initial content-based search results may be removed from the list of search result objects if a determination is made, using the action-based association comparison, that selected search result objects are not associated with the intended search, even if the search result objects include the desired search term . . .

In operation 528, timeline 210 may be accessed, wherein the timeline 210 includes a plurality of timeline entry objects, among other information. In operation 530, timeline 210 may be searched for timeline entry objects that share action-based associations with the content-based search result objects. In operation 532, timeline entry objects may be added to the list of content-based search result objects if a determination is made, using the action-based association comparison, that selected timeline entry objects are associated with the intended search, even if the timeline entry objects do not include the search term. In operation 534, the relevance ranking of the combined list of search results that includes content-based search result objects and action-based search result objects may be adjusted based on results from an updated action-based association comparison. For example, results from the action-based association comparisons may be used to boost the relevancy ranking of selected content-based search result objects or selected action-based search result objects that are determined to share close action-based associations to high-ranking objects. Likewise, results from the action-based association comparisons may be used to reduce the relevancy ranking of selected content-based search result objects or selected action-based search result objects that are determined not to share close action-based associations to other high-ranking objects. One of ordinary skill in the art will readily appreciate that other techniques may be used to improve the relevance ranking and order of desktop search results based on inferred relationships between objects.

In operation 536, a highly relevant ranking of desktop search result objects may be displayed to the user. In operation 538, the user may review and/or modify the relevance ranking list of desktop search result objects. The user also may select search result objects from the relevance ranking list to view content and other information. According to another embodiment of the invention, users may update the relevance ranking list by, for example, adding or removing search result objects from the list or performing other search result object ranking functions.

According to an exemplary embodiment of the invention pertaining to synonymy, a user may be interested in searching for objects that correspond to "notebook computers", which are also known as "laptop computers" or "portable computers". A content-based search for the term "notebook computer" would produce search result objects that include the term "notebook computer", but would not produce search result objects that include only the terms "laptop computer" or "portable computer". According to one embodiment of the invention, an initial content-based relevance ranking of the search result objects may be performed for objects that include the term "notebook computer". According to another embodiment of the invention, the "notebook computer" search result objects may be analyzed for user-action-based information and/or computer-action-based information. An action-based association comparison may be performed between the object that are discovered during the content-based search. The relevance ranking of the "notebook computer" objects may be adjusted based on results received from the action-based association comparison. For example, results from the action-based association comparisons may be used to boost the relevancy ranking of selected "notebook computer" search result objects that are determined to share close action-based associations to high-ranking "notebook computer" objects. Likewise, results from the action-based association comparisons may be used to reduce the relevancy ranking of selected "notebook computer" search result objects that are determined not to share close action-based associations to other high-ranking "notebook computer" objects. "Notebook computer" objects from the initial content-based search results may be removed from the list of search result objects if a determination is made, using the action-based association comparison, that selected search result objects are not associated with "notebook computers", even if the objects include the term "notebook computers".

Timeline 210 may be accessed, wherein the timeline 210 includes a plurality of timeline entry objects, among other information. Timeline 210 may be searched for timeline entry objects that share action-based associations with the "notebook computer" search result objects. Timeline entry objects may be added to the list of "notebook computer" search results if a determination is made, using the action-based association comparison, that selected timeline entry objects are associated with "notebook computers", even if the timeline entry objects do not include the term "notebook computer".

The relevance ranking of the combined list of search results that includes content-based search result objects and action-based search result objects may be adjusted based on results from an updated action-based association comparison. For example, results from the action-based association comparisons may be used to boost the relevancy ranking of selected "notebook computer" search result objects or selected action-based search result objects that are determined to share close action-based associations to high-ranking "notebook computer" objects. Likewise, results from the action-based association comparisons may be used to reduce the relevancy ranking of selected "notebook computer" search result objects or selected action-based search result objects that are determined not to share close action-based associations to other high-ranking "notebook computer" objects. One of ordinary skill in the art will readily appreciate that other techniques may be used to improve the relevance ranking and order of desktop search results based on inferred relationships between objects.

Thus, according to one embodiment of the invention, a content-based listing for "notebook computer" objects may be supplemented with an action-based search that discover any related objects that include the terms "laptop computer" and/or "portable computer," for example. According to one embodiment of the invention, the system may supplement the content-based searching with action-based searching using, for example, user action history information to infer associations between search result objects for "laptop computer" and search result objects for "notebook computer" and/or "portable computer." The action-based search may rely on information such as the temporal order in which the "laptop computer" objects were accessed relative to the "notebook computer" and/or "portable computer" objects, whether any of the "laptop computer" objects were opened contemporaneously with the "notebook computer" and/or "portable computer objects, and other user action information. Additionally, the system may track when the user switches focus between the "laptop computer" objects, the "notebook computer" objects or the "portable computer" objects. The invention may also track an amount of time that the user spends viewing the "notebook computer" objects to infer whether or not they relate to the "laptop computer" objects and/or the "portable computer" objects. One of ordinary skill in the art will readily appreciate that other criteria may be used to infer associations. By contrast, known association engines are not able to associate search result objects that include, for example, content having only the term "laptop computer" with objects that include content having only the terms "notebook computer" and/or "portable computer."

According to an alternative embodiment of the invention, information corresponding to user initiated actions may be used to infer relationships between two or more "laptop computer" objects, "notebook computer" objects, and/or "portable computer" objects. Information corresponding to user initiated actions may include, for example, a temporal proximity in which users access two or more "laptop computer" objects, "notebook computer" objects, and/or "portable computer" objects, a temporal proximity in which users create two or more "laptop computer" objects, "notebook computer" objects, and/or "portable computer" objects, a temporal proximity in which users edit two or more "laptop computer" objects, "notebook computer" objects, and/or "portable computer" objects, operations that users conduct in close time proximity, or other information corresponding to user initiated action information. According to yet another embodiment of the invention, various known statistical methods may be used to infer relationships between two or more "laptop computer" objects, "notebook computer" objects, and/or "portable computer" objects. In view of the combined content-based search and action-based search, the invention overcomes the problem of synonymy.

According to one embodiment of the invention, a highly relevant ranking of desktop search result objects may be displayed to the user. The user may review and/or modify the list of relevance rankings associated with the desktop search.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein.

The invention is not intended to be limited to the embodiments provided above, but rather is to be accorded the widest scope consistent with the principles and novel features disclosed in any fashion herein. The scope of the invention is to be determined solely by the appended claims.

We claim:

1. A method of improving a relevance ranking of search result objects, comprising:
performing a content-based search of a desktop system;
generating an initial relevance ranking of content-based search result objects;
analyzing information associated with the content-based search result objects, wherein the information includes user-action based information or computer-action based information;
performing an action-based association comparison between the content-based search result objects based on the information associated with the content-based search result objects;
adjusting the relevance ranking of the content-based search result objects;
accessing a timeline that includes a plurality of timeline entry objects;
searching the timeline for timeline entry objects that share an action-based association with the content-based search result objects;
generating a combined list of search result objects that include content-based search result objects and timeline entry objects;
adjusting the relevance ranking of the combined list that includes content-based search result objects or timeline entry objects;
presenting the relevance ranking of the combined list of search result objects; and
enabling selection of the search result objects from the combined list.

2. The method according to claim 1, wherein the user-action based information or the computer-action based information are associated with corresponding user initiated actions or computer initiated actions and wherein the timeline stores the user initiated actions or the computer initiated actions in a chronological time order.

3. The method according to claim 2, wherein the user initiated actions or computer initiated actions are tracked during one or more computer sessions associated with a user and wherein the content-based search of the desktop system is performed based on a search term submitted by the user.

4. The method according to claim 1, wherein adjusting the relevance ranking of the content-based search result objects includes boosting the relevance ranking of selected content-based search result objects that are determined to share action-based associations to high-ranking objects.

5. The method according to claim 1, wherein adjusting the relevance ranking of the content-based search result objects includes reducing the relevance ranking of selected content-based search result objects that are determined not to share action-based associations to high-ranking objects.

6. The method according to claim 1, wherein the objects include (i) applications, (ii) documents, (iii) files, (iv) electronic mail messages, (v) chat sessions, (vi) web sites, (vii) address book entries, (viii) calendar entries or any combination of (i) to (viii).

7. The method according to claim 1, further comprising removing content-based search result objects upon a determination that selected search result objects are not associated with an intended search.

8. The method according to claim 7, wherein the determination is made using the action-based association comparison.

9. The method according to claim 8, wherein the removed content-based search result objects include a submitted search term.

10. The method according to claim 1, wherein the timeline entry objects are added to the combined list of search result objects upon a determination that the timeline entry objects are associated with the content-based search result objects.

11. The method according to claim 10, wherein the determination is made using the action-based association comparison.

12. The method according to claim 1, wherein adjusting the relevance ranking of the combined list of search result objects includes boosting the relevance ranking of selected content-based search result objects or timeline entry objects that are determined to share action-based associations to high-ranking objects.

13. The method according to claim 1, wherein adjusting the relevance ranking of the combined list of search result objects includes reducing the relevance ranking of selected content-based search result objects or timeline entry objects that are determined to not share action-based associations to high-ranking objects.

14. A system for improving a relevance ranking of search result objects, comprising:
a target object identifier that receives objects that are discovered during a content-based search of a desktop system and that establishes an initial relevance ranking of content-based search result objects;
an object analyzer that analyzes information associated with the content-based search result objects and performs action-based association comparisons between the content-based search result objects, wherein the information includes user-action based information or computer-action based information;
a timeline searching system that accesses a timeline having timeline entry objects and searches timeline entry objects for action-based associations between the timeline entry objects and the content-based search result objects;
an update ranking system that generates a combined list of search result objects that include content-based search result objects and timeline entry objects and performs action-based association comparisons between the timeline entry objects and the content-based search result objects; and
an interface that displays the relevance ranking and enables selection of the search result objects from the combined list.

15. The system according to claim 14, wherein the user-action based information or the computer-action based information are associated with corresponding user initiated actions or computer initiated actions and wherein the timeline stores user initiated actions or the computer initiated actions in a chronological time order.

16. The system according to claim 15, wherein the user initiated actions or initiated actions are tracked during one or more computer sessions associated with a user and wherein the content-based search of the desktop system is performed based on a search term submitted by the user.

17. The system according to claim 14, wherein the object analyzer adjusts the relevance ranking of the content-based search result objects by boosting the relevance ranking of selected content-based search result objects that are determined to share action-based associations to high ranking objects.

18. The system according to claim 14, wherein the object analyzer adjusts the relevance ranking of the content-based search result objects by reducing the relevance ranking of selected content-based search result objects that are determined not to share action-based associations to high ranking objects.

19. The system according to claim 14 wherein the objects include (i) applications, (ii) documents, (iii) files, (iv) electronic mail messages, (v) chat sessions, (vi) web sites, (vii) address book entries, (viii) calendar entries or any combination of (i) to (viii).

20. The system according to claim 14 wherein the object analyzer removes content-based search result objects upon a determination that selected search result objects are not associated with an intended search.

21. The system according to claim 20, wherein the determination is made using the action-based association comparison.

22. The system according to claim 21, wherein the removed content-based search result objects include a submitted search term.

23. The system according to claim 14, wherein the timeline searching system adds timeline entry objects to the combined list of search result objects upon a determination that the timeline entry objects are associated with the content-based search result objects.

24. The system according to claim 23, wherein the determination is made using the action-based association comparison.

25. The system according to claim 14, wherein the update ranking system adjusts the relevance ranking of the combined list of search result objects includes boosting the relevance ranking of selected content-based search result objects or timeline entry objects that are determined to share action-based associations to high-ranking objects.

26. The system according to claim 14, wherein the update ranking system adjusts the relevance ranking of the combined list of search result objects includes reducing the relevance ranking of selected content-based search result objects or timeline entry objects that are determined to not share action-based associations to high-ranking objects.

* * * * *